United States Patent
Sivakumar et al.

(10) Patent No.: US 12,208,645 B2
(45) Date of Patent: Jan. 28, 2025

(54) FRONT AXLE FOR MINING MACHINES

(71) Applicant: Caterpillar Inc., Peoria, IL (US)

(72) Inventors: Dinesh Sivakumar, Neyveli (IN); Regini Selvapalace Ehuraj, Chennai (IN); Steven J. Fujan, Oro Valley, AZ (US); Scott M Shaffer, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 422 days.

(21) Appl. No.: 17/657,372

(22) Filed: Mar. 31, 2022

(65) Prior Publication Data

US 2023/0311569 A1  Oct. 5, 2023

(51) Int. Cl.
*B60B 35/08* (2006.01)

(52) U.S. Cl.
CPC .......... *B60B 35/08* (2013.01); *B60Y 2200/41* (2013.01)

(58) Field of Classification Search
CPC ......... B60B 35/08; B60B 35/02; B60B 35/04; B60B 35/06
See application file for complete search history.

(56) References Cited

U.S. PATENT DOCUMENTS

| | | | | |
|---|---|---|---|---|
| 2,685,479 A | * | 8/1954 | Buckendale | B60B 35/08 |
| | | | | 301/124.1 |
| 2,911,262 A | | 11/1959 | Franck | |
| 3,269,214 A | * | 8/1966 | Nagel | B60B 35/16 |
| | | | | 74/607 |
| 3,804,467 A | * | 4/1974 | Austermann | B60B 35/06 |
| | | | | 301/124.1 |
| 4,921,159 A | * | 5/1990 | Peck | B60B 35/16 |
| | | | | 29/463 |
| 7,510,197 B2 | | 3/2009 | Gottschalk | |
| 2005/0062341 A1 | | 3/2005 | Reineck | |
| 2015/0130262 A1 | * | 5/2015 | Fuks | B21K 1/12 |
| | | | | 301/124.1 |
| 2016/0031279 A1 | * | 2/2016 | Aalderink | B60G 11/46 |
| | | | | 280/124.175 |
| 2018/0029414 A1 | | 2/2018 | Khanfar et al. | |

FOREIGN PATENT DOCUMENTS

| | | | | |
|---|---|---|---|---|
| BE | 873962 A | * | 5/1979 | ............. B21K 1/063 |
| DE | 4232779 C1 | * | 2/1994 | ............. B60B 35/08 |
| DE | 4300158 A1 | * | 7/1994 | ............... B21B 1/08 |
| DE | 102013207314 A1 | * | 10/2014 | ........... B60B 35/025 |
| EP | 1500525 B1 | | 8/2009 | |

(Continued)

*Primary Examiner* — Kip T Kotter

(57) ABSTRACT

An axle, for a mining machine, includes one or more segments, each defining a first wall portion, a second wall portion disposed opposite to the first wall portion, a third wall portion, and a fourth wall portion. The third wall portion extends between the first and the second wall portions to meet the first wall portion at a first corner portion and the second wall portion at a second corner portion. The fourth wall portion extends between the first and the second wall portions to meet the first wall portion at a third corner portion and the second wall portion at a fourth corner portion. The second thickness of the second corner portion and the third thickness of the third corner portion are greater than each of the first thickness of the first corner portion and the fourth thickness of the fourth corner portion.

20 Claims, 7 Drawing Sheets

(56) References Cited

FOREIGN PATENT DOCUMENTS

| EP | 2108469 A1 | * | 10/2009 | ............ | B21D 53/90 |
| EP | 3208105 B1 | | 12/2020 | | |
| JP | H1035209 A | | 2/1998 | | |
| JP | 3591956 B2 | | 11/2004 | | |
| WO | WO-2020125425 A1 | * | 6/2020 | ............ | B60B 35/02 |

* cited by examiner

FRONT AXLE FOR MINING MACHINES

TECHNICAL FIELD

The present disclosure relates generally to a mining machine, such as an off-highway truck. More particularly, the present disclosure relates to an axle (e.g., a front axle) for the mining machine.

BACKGROUND

Mining machines, such as off-highway trucks, are generally employed to transport materials such as ores, boulders, sand, dirt, gravel, etc., from one location to another location at a mine site. Such a mining machine typically includes one or more axles to movably support one or more traction devices against a chassis of the mining machine. For example, a front axle may support a set of forward traction devices of the mining machine against a front portion of the chassis and a rear axle may support a set of rearward tractions devices against a rear portion of the chassis.

With regard to a coupling of such axles to the chassis, such axles may be coupled to the chassis via one or more links, such as drag links, suspension struts, panhard rods, etc. By way of such an arrangement, such axles are designated to interplay with the chassis during machine motion and accommodate the various stresses or loads encountered during machine motion, and therefore, an axle is required to exhibit sufficient stiffness and rigidity.

U.S. Pat. No. 2,911,262 discloses an axle. The axle includes a center section and two end sections connected to opposite ends of the center section. The center section and the two end sections are welded together continuously around the circumference or cross-sectional perimeter thereof, to constitute a hollow steel tubular axle.

SUMMARY OF THE INVENTION

In one aspect, the disclosure relates to an axle for a mining machine. The axle includes one or more segments. Each segment of the one or more segments defines a first wall portion and a second wall portion disposed opposite to the first wall portion. Also, each segment of the one or more segments defines a third wall portion and a fourth wall portion. The third wall portion extends between the first wall portion and the second wall portion to meet the first wall portion at a first corner portion and the second wall portion at a second corner portion. The fourth wall portion is disposed spaced apart from the third wall portion and extends between the first wall portion and the second wall portion to meet the first wall portion at a third corner portion and the second wall portion at a fourth corner portion. The first corner portion has a first thickness, the second corner portion has a second thickness, the third corner portion has a third thickness, and the fourth corner portion has a fourth thickness. The second thickness and the third thickness are greater than each of the first thickness and the fourth thickness.

In yet another aspect, the disclosure is related to a machine. The machine includes a chassis and an axle coupled to the chassis. The axle includes one or more segments. Each segment of the one or more segments defines a first wall portion and a second wall portion disposed opposite to the first wall portion. Also, each segment of the one or more segments defines a third wall portion and a fourth wall portion. The third wall portion extends between the first wall portion and the second wall portion to meet the first wall portion at a first corner portion and the second wall portion at a second corner portion. The fourth wall portion is disposed spaced apart from the third wall portion and extends between the first wall portion and the second wall portion to meet the first wall portion at a third corner portion and the second wall portion at a fourth corner portion. The first corner portion has a first thickness, the second corner portion has a second thickness, the third corner portion has a third thickness, and the fourth corner portion has a fourth thickness. The second thickness and the third thickness are greater than each of the first thickness and the fourth thickness.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
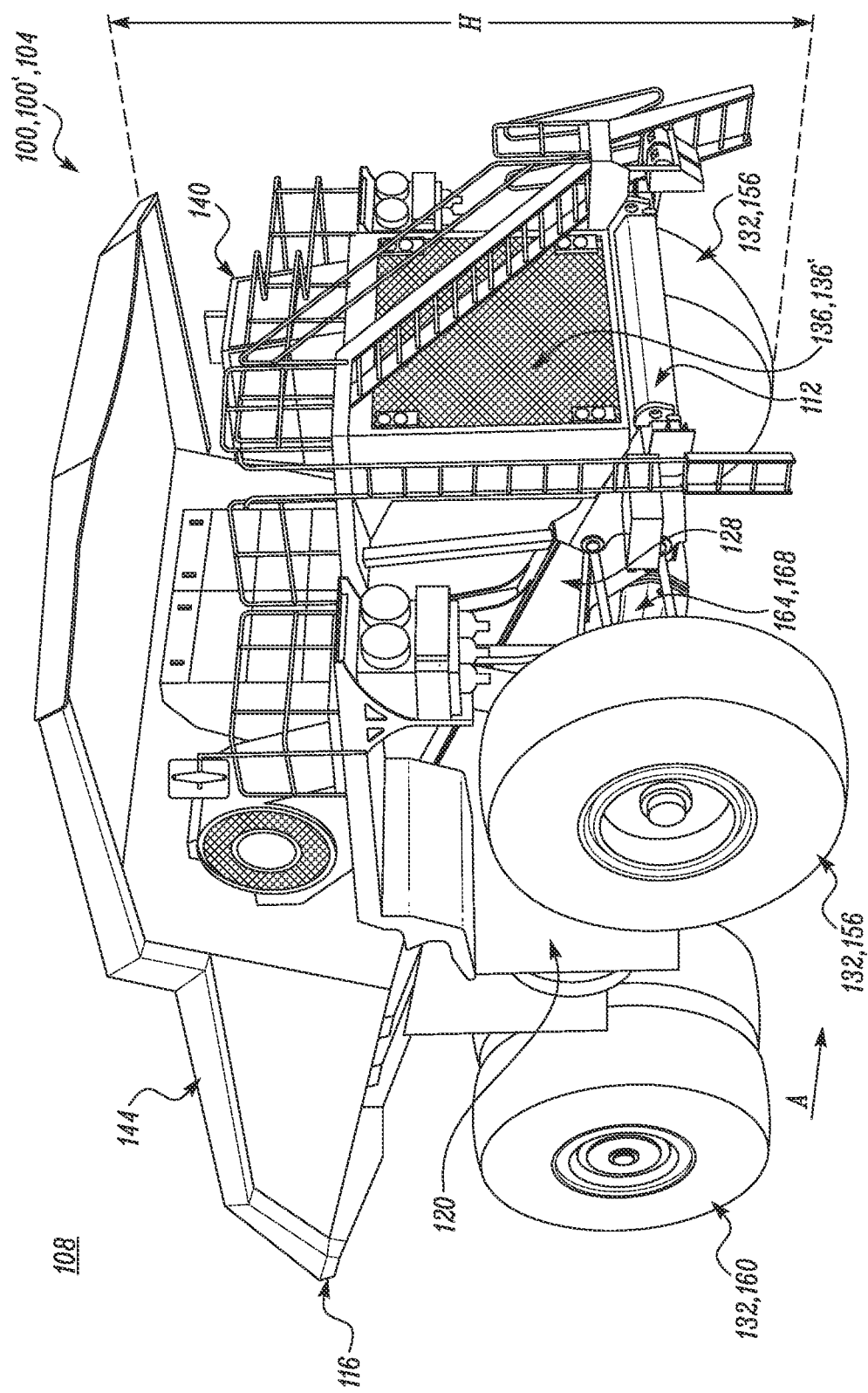
FIG. 1 illustrates an exemplary machine, in accordance with an embodiment of the present disclosure

Referring to FIG. 1, an exemplary machine 100 is shown. The machine 100 is a mining machine 100'. The mining machine 100' may exemplarily embody a dump truck 104. The machine 100 may be operable at a worksite 108, and may repeatedly traverse back and forth relative to various locations on the worksite 108. Such locations may include load locations from where the machine 100 may receive payload (e.g., ores, boulders, sand, dirt, gravel, etc., not shown), and dump locations up to where the machine 100 may traverse to so as to release and dump the payload. In an exemplary operation, the dump truck 104 may receive the payload from a dump location of the worksite 108, traverse in a forward direction (indicated by an arrow 'A') from a load location toward a dump location of the worksite 108, release and dump the payload at the dump location, and traverse back toward the load location. Examples of the worksite 108 may include a mine site, an underground mine site, a construction site, a landfill, a quarry, etc.

Although references to the dump truck 104 are used, aspects of the present disclosure may also be applicable to other mining machines, such as underground articulated dump trucks, haul trucks, loaders, etc., that may be applicable in areas where repeated back and forth movement is needed, and references to the dump truck 104 in the present disclosure is to be viewed as purely exemplary.

The machine 100 (or the mining machine 100') may include a front end 112 and a rear end 116 opposite to the front end 112. The front end 112 may be defined toward the forward direction 'A' (i.e., direction in which the machine 100 generally travels from the load location to the dump location of the worksite 108, or vice versa). Also, the machine 100 may include two lateral sides, i.e., a first lateral side 120 (or right side) and a second lateral side 124 (or left side) opposite to the first lateral side 120 (please see FIG. 3). The first lateral side 120 and the second lateral side 124 may be located transversely relative to the forward direction 'A' of the machine 100.

The machine 100 (or the mining machine 100') includes a chassis 128, one or more traction assemblies 132, a propulsion system 136, an operator cabin 140, and a dump body 144. The chassis 128 may define a front chassis portion 148 and a rear chassis portion 152 (please see FIG. 3). The front chassis portion 148 may accommodate and/or support the propulsion system 136 and the operator cabin 140, although other known components and structures may be supported by the front chassis portion 148, as well. The rear chassis portion 152 may support the dump body 144 of the machine 100.

The traction assemblies 132 may support the chassis 128 on ground at the worksite 108. The traction assemblies 132 may include a set of front wheels 156 and a set of rear wheels 160. The set of front wheels 156 supports the front chassis portion 148, and the set of rear wheels 160 supports the rear chassis portion 152. In some embodiments, the traction assemblies 132 may include crawler tracks (not shown) provided either alone or in combination with the wheels 156, 160.

The propulsion system 136 may include a power compartment 136' and a power source (not shown), such as an internal combustion engine, provided within the power compartment 136'. The power source may be configured to power operations of various systems on the machine 100, typically by combusting fuel. For example, the power source may power the front wheels 156 and the rear wheels 160 to propel and transport the machine 100 across an expanse of the worksite 108, according to any customary practice known in the art. In other embodiments, the propulsion system 136 may also include an electrical power source, applicable either alone or in combination with the internal combustion engine.

The operator cabin 140 may be supported over the chassis 128 (e.g., on the front chassis portion 148). The operator cabin 140 may facilitate stationing of one or more operators therein, to monitor the operations of the machine 100. Also, the operator cabin 140 may house various components and controls of the machine 100, access to one or more of which may help the operators to control the machine's movement and/or operation. For example, the various components and controls of the machine 100 may include one or more steering wheels, braking pedals, accelerating pedals, joysticks, switches etc., to facilitate an operator in operating the machine 100 and the dump body 144.

Further, the machine 100 (or the mining machine 100') includes one or more axle assemblies 164. The axle assemblies 164 may be configured to movably support the traction assemblies 132 against the chassis 128 of the machine 100. The axle assemblies 164 includes a front axle assembly 168 and a rear axle assembly (not shown). The front axle assembly 168 may support the set of front wheels 156 against the front chassis portion 148, and the rear axle assembly (not shown) may support the set of rear wheels 160 against the rear chassis portion 152.

Figure 2:
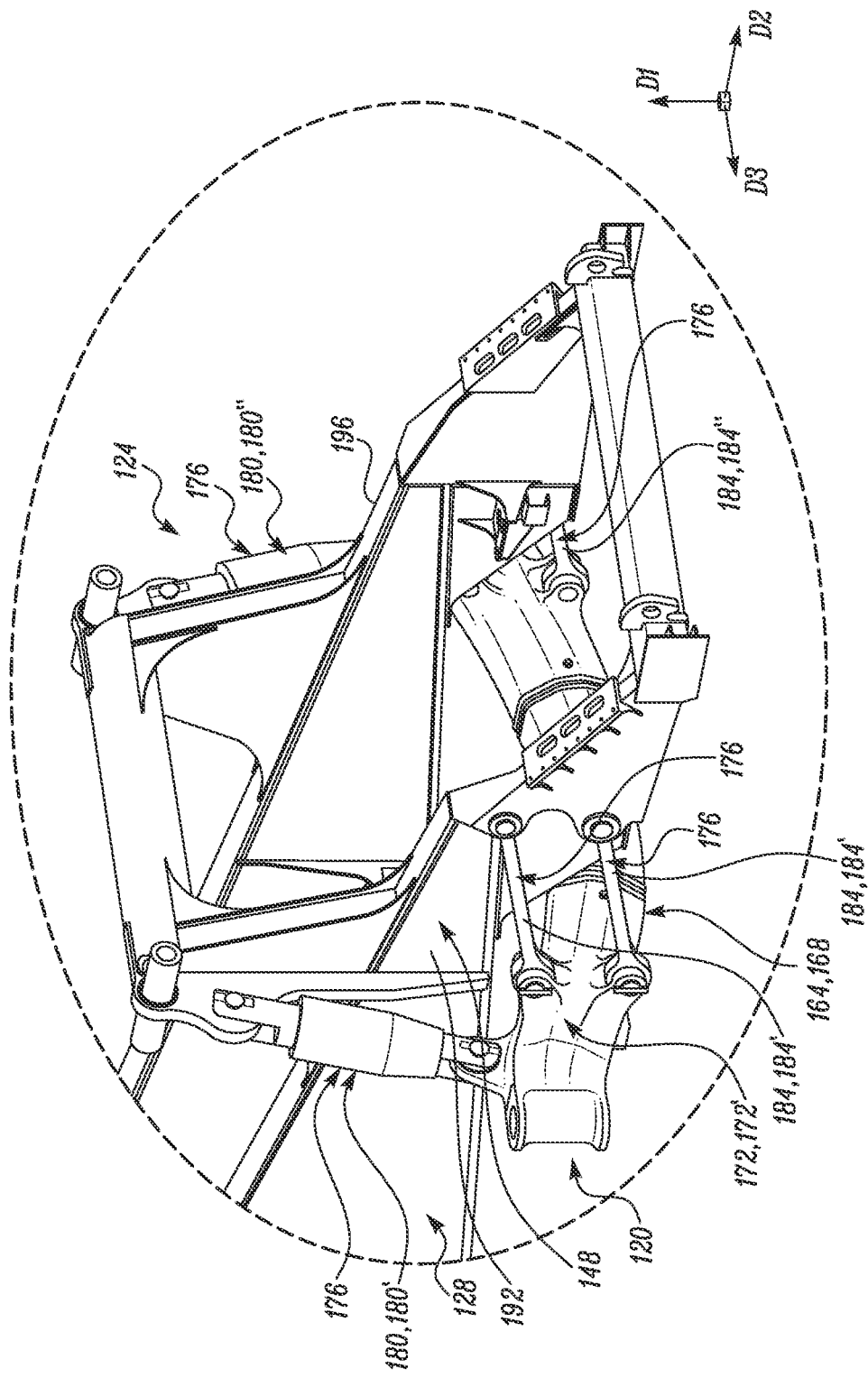
FIG. 2 illustrates a chassis and an axle assembly of the exemplary machine, in accordance with an embodiment of the present disclosure.
Figure 3:
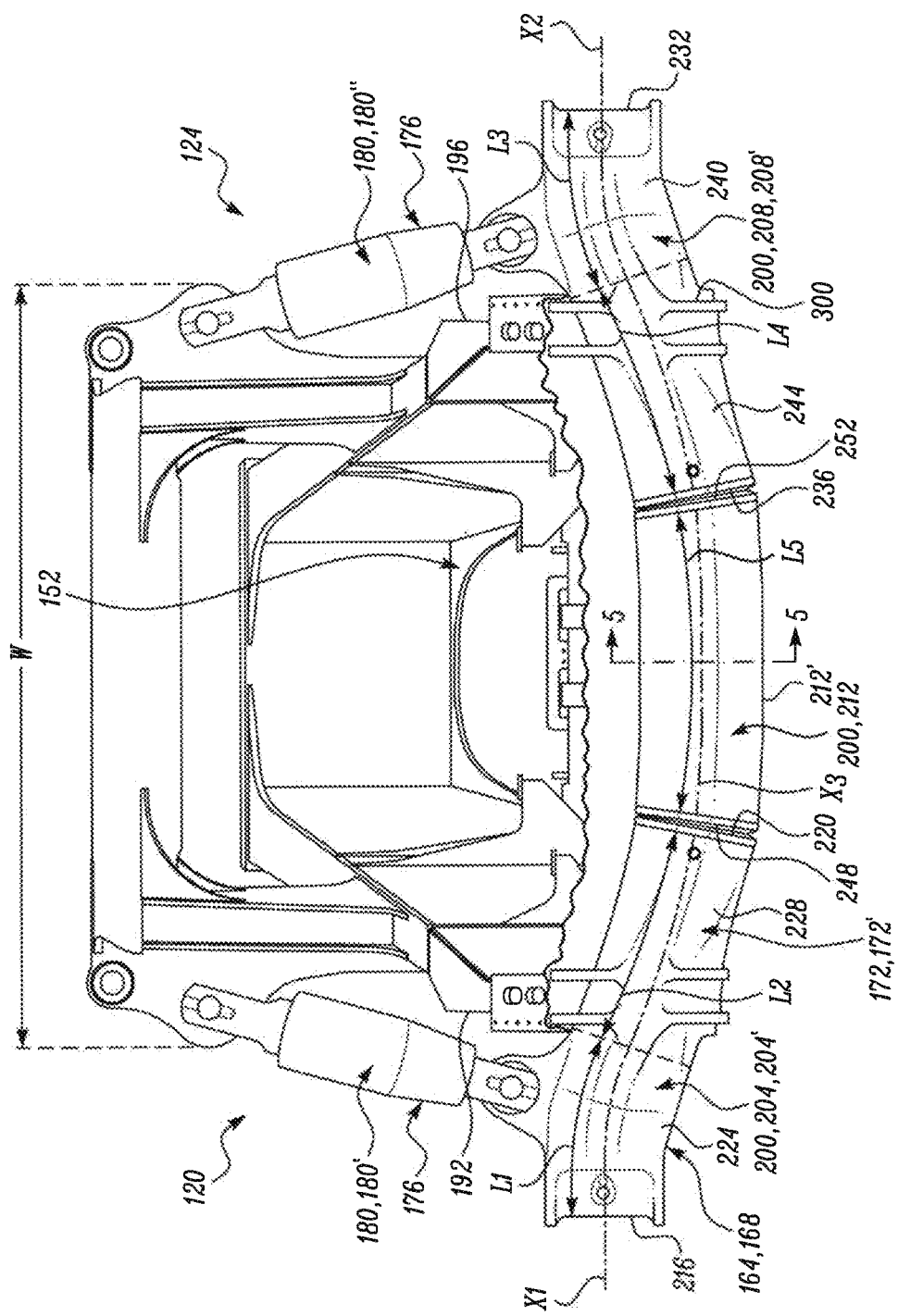
FIG. 3 illustrates the axle assembly from a front end of the exemplary machine, in accordance with an embodiment of the present disclosure.
Figure 4:
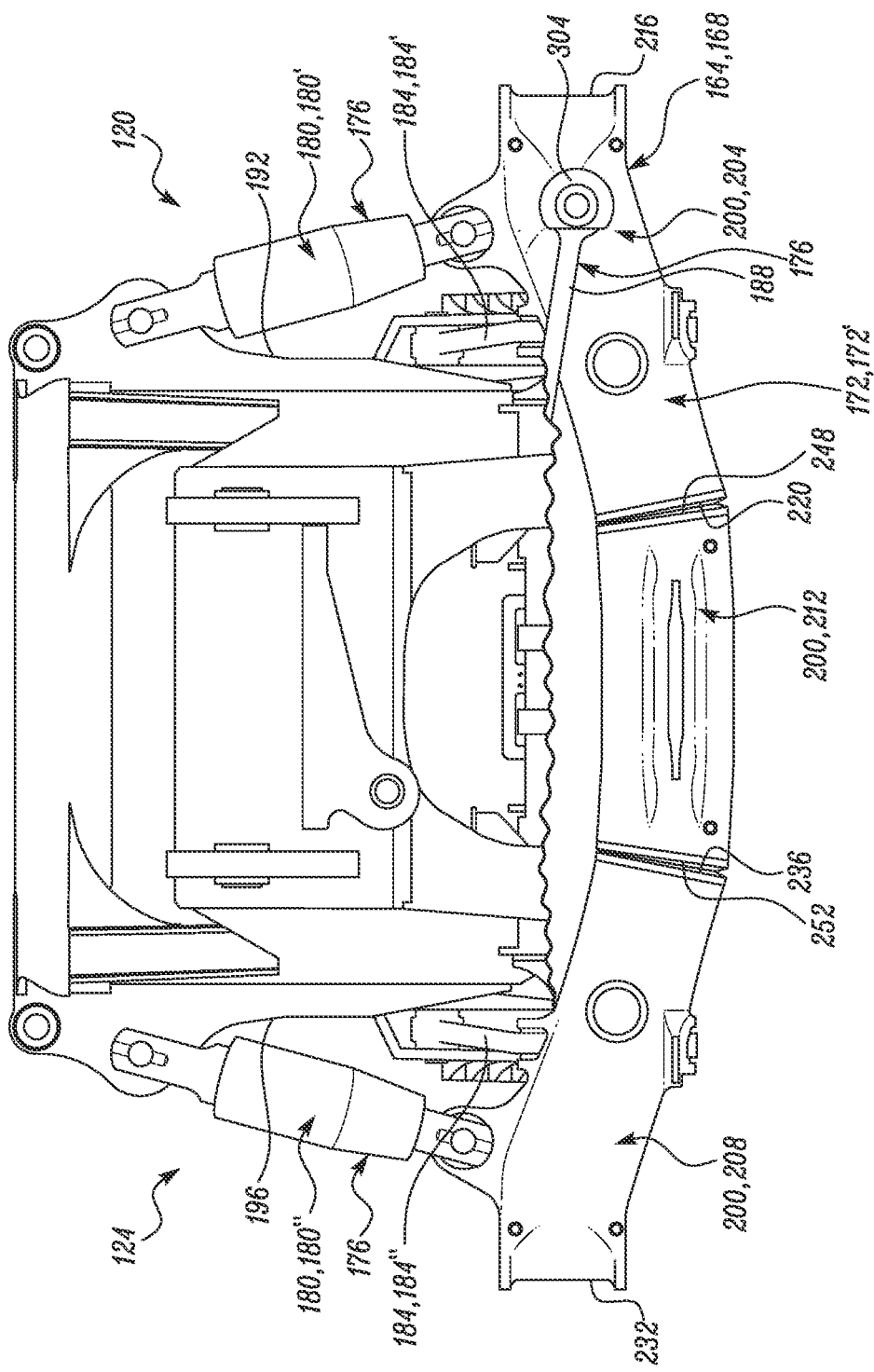
FIG. 4 illustrates the axle assembly from a rear end of the exemplary machine, in accordance with an embodiment of the present disclosure.

Referring to FIGS. 2, 3, and 4, the front axle assembly 168 is discussed. The front axle assembly 168 includes an axle 172 (discussed later in the present disclosure) and one or more links 176. The links 176 may be configured to couple the axle 172 with the front chassis portion 148. The links 176 may include a pair of suspension struts 180, two pairs of drag links 184, and a panhard rod 188 (please see FIG. 4).

The pair of suspension struts 180 may include a first suspension strut 180' and a second suspension strut 180". The first suspension strut 180' may couple the axle 172 to a first side 192 (disposed toward the first lateral side 120 of the machine 100) of the front chassis portion 148. The second suspension strut 180" may couple the axle 172 to a second side 196 (disposed opposite to the first side 192 and toward the second lateral side 124 of the machine 100) of the front chassis portion 148. The first suspension strut 180' and the second suspension strut 180" may be configured to restrain and constrain movements of the axle 172 in a vertical direction 'D1' defined along a height 'H' of the machine 100.

Two pairs of drag links 184 may include a first pair of drag links 184' and a second pair of drag links 184". The first pair of drag links 184' may couple the axle 172 to the first side 192 of the front chassis portion 148, and the second pair of drag links 184" may couple the axle 172 to the second side 196 of the front chassis portion 148. The first pair of drag links 184' and the second pair of drag links 184" may be configured to restrain and constrain movements of the axle 172 in a longitudinal direction 'D2' defined parallel to the direction of travel (i.e., forward direction 'A') of the machine 100.

The panhard rod 188 may couple the axle 172 to the at least one side (i.e., the first side 192 or the second side 196) of the front chassis portion 148. In the present embodiment, as shown in FIG. 4, the panhard rod 188 connects the axle 172 to the first side 192 of the front chassis portion 148. The panhard rod 188 may be configured to restrain and constrain movements of the axle 172 in a lateral direction 'D3' defined along a width 'W' of the front chassis portion 148.

The axle 172 is now discussed. The axle 172 may corresponds to a dead axle 172'. The axle 172 includes one or more segments 200. The one or more segments 200 may correspond to at least three segments 200 joined together to form the axle 172. In the present embodiment, the axle 172 includes three segments 200—a first segment 204, a second segment 208, and a third segment 212 (please see FIG. 3 and FIG. 4).

The first segment 204 may be an arcuate segment 204' defining a first arcuate longitudinal axis 'X1'. The first segment 204 (or the arcuate segment 204') may define a first end 216 and a second end 220. The first end 216 and the second end 220 are spaced apart from each other along the first arcuate longitudinal axis '. Also, the first segment 204 (or the arcuate segment 204') may define a first portion 224 and a second portion 228. The first portion 224 may extend from the first end 216 toward the second end 220 along a first length 11' of the first segment 204. The second portion 228 may extend away from the first portion 224 toward the second end 220 along a second length 12' of the first segment 204. The first portion 224 may define a concavity that faces away from the front chassis portion 148, and the second portion 228 may define a concavity that faces toward the front chassis portion 148, when the axle 172 is coupled to the front chassis portion 148.

Similar to the first segment 204, the second segment 208 may be an arcuate segment 208' defining a second arcuate longitudinal axis 'X2'. The second segment 208 (or the arcuate segment 208') may define a third end 232 and a fourth end 236. The third end 232 and the fourth end 236 are spaced apart from each other along the second arcuate longitudinal axis 'X2'. Also, the second segment 208 (or the arcuate segment 208') may define a third portion 240 and a fourth portion 244. The third portion 240 may extend from the third end 232 toward the fourth end 236 along a third length 13' of the second segment 208. The fourth portion 244 may extend away from the third portion 240 toward the fourth end 236 along a fourth length 14' of the second segment 208. The third portion 240 may define a concavity that faces away from the front chassis portion 148, and the fourth portion 244 may define a concavity that faces toward the front chassis portion 148, when the axle 172 is coupled to the front chassis portion 148.

The third segment 212 may be an arcuate segment 212' defining a third arcuate longitudinal axis 'X3'. The third segment 212 (or the arcuate segment 208') may define a fifth end 248 and a sixth end 252. The fifth end 248 and the sixth end 252 are spaced apart from each other along the third arcuate longitudinal axis 'X3'. Also, the third segment 212 may define a fifth length 15' extending between the fifth end 248 and the sixth end 252 along the third arcuate longitudinal axis 'X3'. In addition, the third segment 212 may define a concavity that faces toward the front chassis portion 148, when the axle 172 is coupled to the front chassis portion 148.

The first segment 204, the second segment 208, and the third segment 212 may be joined together. For example, the fifth end 248 of the third segment 212 is coupled to the second end 220 of the first segment 204, and the sixth end 252 of the third segment 212 is coupled to the fourth end 236 of the second segment 208, by welding. In this way, the first segment 204, the second segment 208, and the third segment 212 may be joined together to impart an integral and contiguously extending U-shaped profile to the axle 172. Also, the axle 172 may have an overall length equal to the summation of the first length 11', the second length 12', the third length 13', the fourth length 14', and the fifth length 15'.

When the axle 172 is mounted on the machine 100, the first segment 204 may be disposed toward the first lateral side 120 of the machine 100, the second segment 208 may be disposed toward the second lateral side 124 of the machine 100, and the third segment 212 may be disposed between the first segment 204 and the second segment 208.

Figure 5:
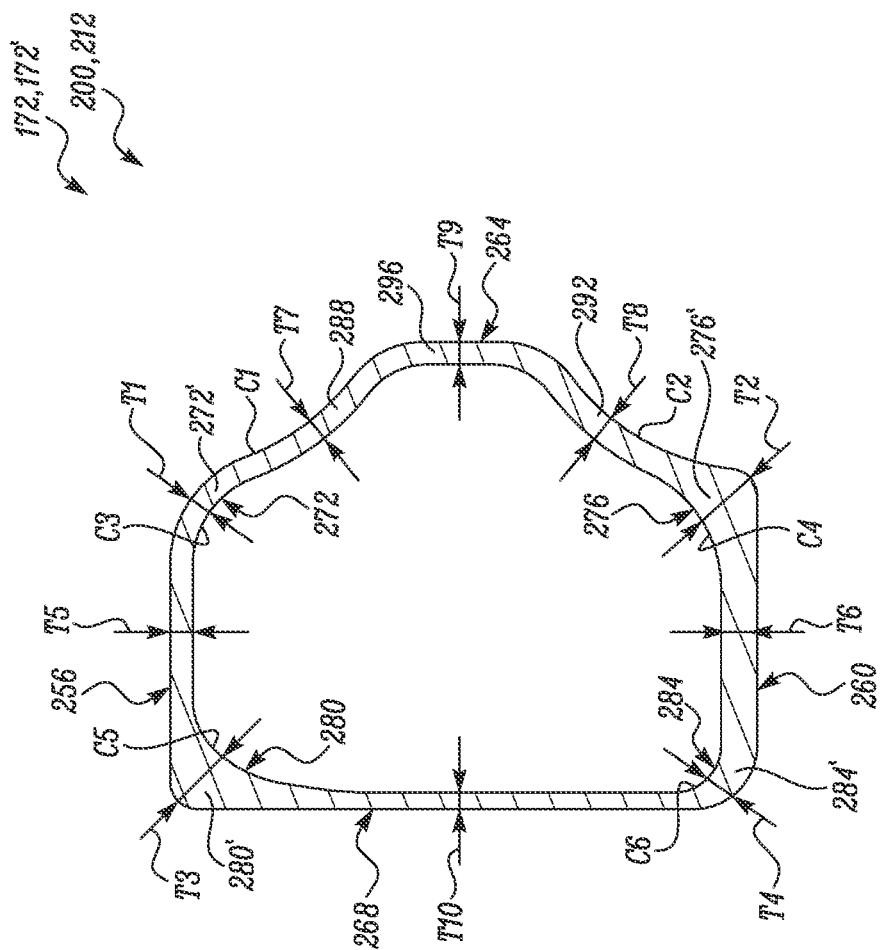
FIG. 5 illustrates a cross-sectional view of an axle of the axle assembly about a plane 5-5 in FIG. 3, in accordance with an embodiment of the present disclosure.

Referring to FIG. 5, a cross-section of the third segment 212 of the axle 172, about a plane 5-5 in FIG. 3, is discussed. Each of the first segment 204 and the second segment 208 may have a cross-section substantially similar to the cross-section of the third segment 212 (as shown in FIG. 5), and hence, discussions regarding the cross-sections of the first segment 204 and the second segment 208 are omitted.

The third segment 212 includes a first wall portion 256, a second wall portion 260, a third wall portion 264, and a fourth wall portion 268. Also, the third segment 212 includes a first corner portion 272, a second corner portion 276, a third corner portion 280, and a fourth corner portion 284.

The first wall portion 256 and the second wall portion 260 may be disposed opposite, spaced apart, and substantially parallel to each other. Also, the first wall portion 256 may be disposed at a height relative to the second wall portion 260 such that the first wall portion 256 may be positioned closer to the front chassis portion 148 than the second wall portion 260, when the axle 172 is coupled to the front chassis portion 148 of the machine 100.

The first wall portion 256 may have a fifth thickness 'T5', and the second wall portion 260 may have a sixth thickness 'T6'. In the present embodiment, the sixth thickness 'T6' of the second wall portion 260 is greater than the fifth thickness 'T5' of the first wall portion 256. For example, the fifth thickness 'T5' of the first wall portion 256 is 20 millimeters, and sixth thickness 'T6' of the second wall portion 260 is 35 millimeters. In another embodiment, the sixth thickness 'T6' of the second wall portion 260 may be equal to the fifth thickness 'T5' of the first wall portion 256. For example, the fifth thickness 'T5' of the first wall portion 256 is 35 millimeters, and sixth thickness 'T6' of the second wall portion 260 is 35 millimeters.

The third wall portion 264 may define a first arcuate section 288, a second arcuate section 292, and an intermediate section 296. The first arcuate section 288 may define a first concavity 'C1' that faces away from the fourth wall portion 268. Also, the first arcuate section 288 may have a seventh thickness 'T7'. The second arcuate section 292 may define a second concavity 'C2' that faces away from the fourth wall portion 268. Also, the second arcuate section 292 may have an eighth thickness 'T8'. The eighth thickness 'T8' of the second arcuate section 292 may be greater than the seventh thickness 'T7' of the first arcuate section 288. For example, the seventh thickness 'T7' of the first arcuate section 288 is 25 millimeters, and the eighth thickness 'T8' of the second arcuate section 292 is 40 millimeters.

The intermediate section 296 connects the first arcuate section 288 to the second arcuate section 292. The intermediate section 296 may have a ninth thickness 'T9'. In the present embodiment, the ninth thickness 'T9' of the intermediate section 296 is greater than the seventh thickness 'T7' of the first arcuate section 288 but lower than the eighth thickness 'T8' of the second arcuate section 292. In other embodiments, the ninth thickness 'T9' of the intermediate section 296 may be equal to the seventh thickness 'T7' of the first arcuate section 288 but lower than the eighth thickness 'T8' of the second arcuate section 292.

The third wall portion 264 extends between the first wall portion 256 and the second wall portion 260. The third wall portion 264 meets the first wall portion 256 at the first corner portion 272. Also, the third wall portion 264 meets the second wall portion 260 at the second corner portion 276. In the present embodiment, the first arcuate section 288 of the third wall portion 264 may extend outwardly from the first corner portion 272 and meet one end of the intermediate section 296, and the second arcuate section 292 of the third wall portion 264 may extend outwardly from the second corner portion 276 and meet the other end of the intermediate section 296.

Further, the third wall portion 264 may be disposed toward the front end 112 of the machine 100 (or the mining machine 100'), when the axle 172 is coupled to the front chassis portion 148. Also, the third wall portion 264 may be disposed proximal to the front end 112 of the machine 100 (or the mining machine 100') and distal to the rear end 116 of the machine 100 (or the mining machine 100'), when the axle 172 is coupled to the front chassis portion 148.

The fourth wall portion 268 is disposed spaced apart from the third wall portion 264. Also, the fourth wall portion 268 may be disposed upright relative to the second wall portion 260. The fourth wall portion 268 may have a tenth thickness 'T10'. The tenth thickness 'T10' of the fourth wall portion 268 may be relatively lower than each of the thickness 'T5' of the first wall portion 256 and the thickness 'T6' of the second wall portion 260. Further, the fourth wall portion 268 extends between the first wall portion 256 and the second wall portion 260. The fourth wall portion 268 meets the first wall portion 256 at the third corner portion 280, and meets the second wall portion 260 at the fourth corner portion 284.

The fourth wall portion 268 may be disposed toward the rear end 116 of the machine 100 (or the mining machine 100'), when the axle 172 is coupled to the front chassis portion 148. Also, the fourth wall portion 268 may be disposed proximal to the rear end 116 of the machine 100 (or the mining machine 100') and distal to the front end 112 of the machine 100 (or the mining machine 100'), when the axle 172 is coupled to the front chassis portion 148.

The first corner portion 272 corresponds to a first fillet portion 272' disposed between the first wall portion 256 and the third wall portion 264 (or the first arcuate section 288) to uninterruptedly and contiguously connect the first wall portion 256 with the third wall portion 264 (or the first arcuate section 288). The first corner portion 272 (or the first fillet portion 272') may define a third concavity 'C3' that faces toward the fourth wall portion 268. Further, the first corner portion 272 has a first thickness 'T1'. In an exemplary embodiment, the first thickness 'T1' of the first corner portion 272 may be in a range of 10 millimeters to 50 millimeters.

The second corner portion 276 corresponds to a second fillet portion 276' disposed between the second wall portion 260 and the third wall portion 264 (or the second arcuate section 292) to uninterruptedly and contiguously connect the second wall portion 260 with the third wall portion 264 (or the second arcuate section 292). The second corner portion 276 (or the second fillet portion 276') may define a fourth concavity 'C4' that faces toward the fourth wall portion 268. Further, the second corner portion 276 has a second thickness 'T2'. The second thickness 'T2' of the second corner portion 276 is greater than the first thickness 'T1' of the first corner portion 272. In an exemplary embodiment, the second thickness 'T2' of the second corner portion 276 may be in a range of 20 millimeters to 150 millimeters.

The third corner portion 280 corresponds to a third fillet portion 280' disposed between the first wall portion 256 and the fourth wall portion 268 to uninterruptedly and contiguously connect the first wall portion 256 with the fourth wall portion 268. The third corner portion 280 (or the third fillet portion 280') may define a fifth concavity 'C5' that faces toward the third wall portion 264. Also, the third corner portion 280 has a third thickness 'T3'. The third thickness 'T3' of the third corner portion 280 is greater than the first thickness 'T1' of the first corner portion 272. In an exemplary embodiment, the third thickness 'T3' of the third corner portion 280 may be in a range of 20 millimeters to 150 millimeters.

Further, in the present embodiment, the third thickness 'T3' of the third corner portion 280 is relatively lesser than the second thickness 'T2' of the second corner portion 276. In other words, the second thickness 'T2' of the second corner portion 276 is greater than the third thickness 'T3' of the third corner portion 280. For example, the second thickness 'T2' of the second corner portion 276 is 65 millimeters, and the third thickness 'T3' of the third corner portion 280 is 62.5 millimeters. In another embodiment, the third thickness 'T3' of the third corner portion 280 and the second thickness 'T2' of the second corner portion 276 are equal to each other. For example, the second thickness 'T2' of the second corner portion 276 is 75 millimeters, and the third thickness 'T3' of the third corner portion 280 is 75 millimeters.

The fourth corner portion 284 corresponds to a fourth fillet portion 284' disposed between the second wall portion 260 and the fourth wall portion 268 to uninterruptedly and contiguously connect the second wall portion 260 with the fourth wall portion 268. The fourth corner portion 284 (or the fourth fillet portion 284') may define a sixth concavity 'C6' that faces toward the third wall portion 264. Also, the fourth corner portion 284 has a fourth thickness 'T4'. The fourth thickness 'T4' of the fourth corner portion 284 is relatively lesser than each of the second thickness 'T2' of the second corner portion 276 and the third thickness 'T3' of the third corner portion 280. In other words, each of the second thickness 'T2' of the second corner portion 276 and the third thickness 'T3' of the third corner portion 280 is greater than the fourth thickness 'T4' of the fourth corner portion 284. In an exemplary embodiment, the fourth thickness 'T4' of the fourth corner portion 284 may be in a range of 10 millimeters to 50 millimeters.

Figure 6:
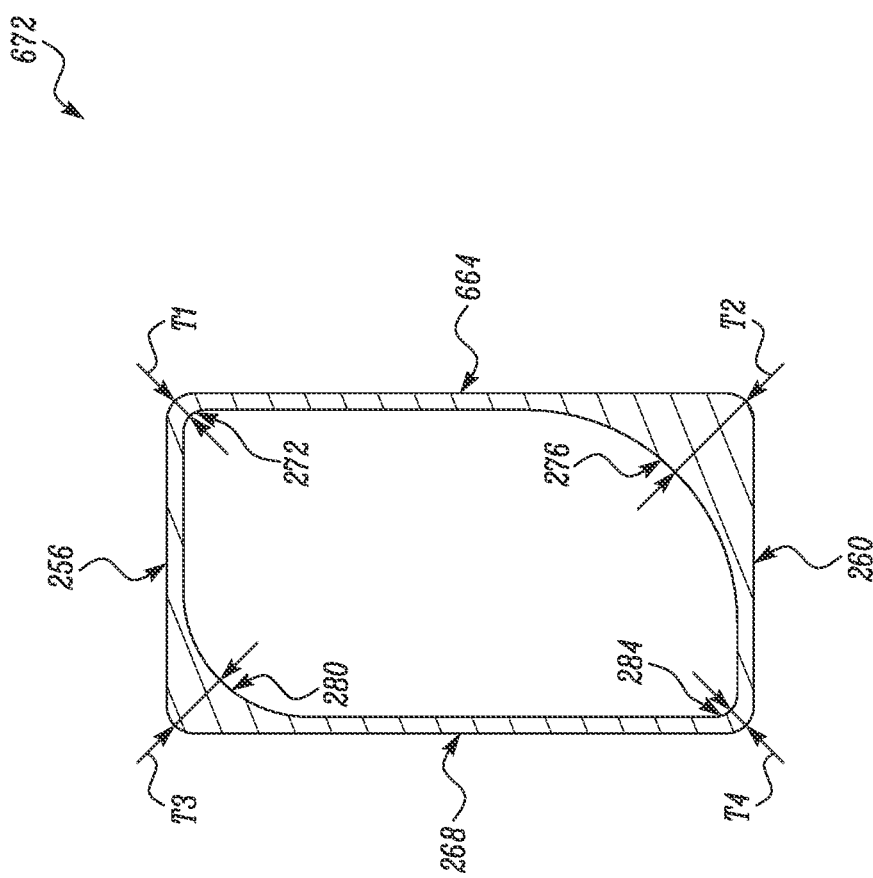
FIG. 6 illustrates a cross-sectional view of an axle of the axle assembly, in accordance with another embodiment of the present disclosure.

Referring to FIG. 6, a cross-section of an axle 672 is shown. The axle 672 may be similar in many respects to the axle 172 but may differ from the axle 172 in that the third wall portion 264 (defining the first arcuate section 288, the second arcuate section 292, and the intermediate section 296) is omitted. Rather, the axle 672 includes a third wall portion 664. The third wall portion 664 may be disposed spaced apart from the fourth wall portion 268. The third wall portion 664 may be disposed upright relative to the second wall portion 260. Similar to the third wall portion 264, the third wall portion 664 extends between the first wall portion 256 and the second wall portion 260 to meet the first wall portion 256 at the first corner portion 272 and the second wall portion 260 at the second corner portion 276. Further, the third wall portion 664 may be disposed toward the front end 112 of the machine 100 (or the mining machine 100'), when the axle 672 is coupled to the front chassis portion 148. Also, the third wall portion 664 may be disposed proximal to the front end 112 of the machine 100 (or the mining machine 100') and distal to the rear end 116 of the machine 100 (or the mining machine 100'), when the axle 672 is coupled to the front chassis portion 148.

Figure 7:
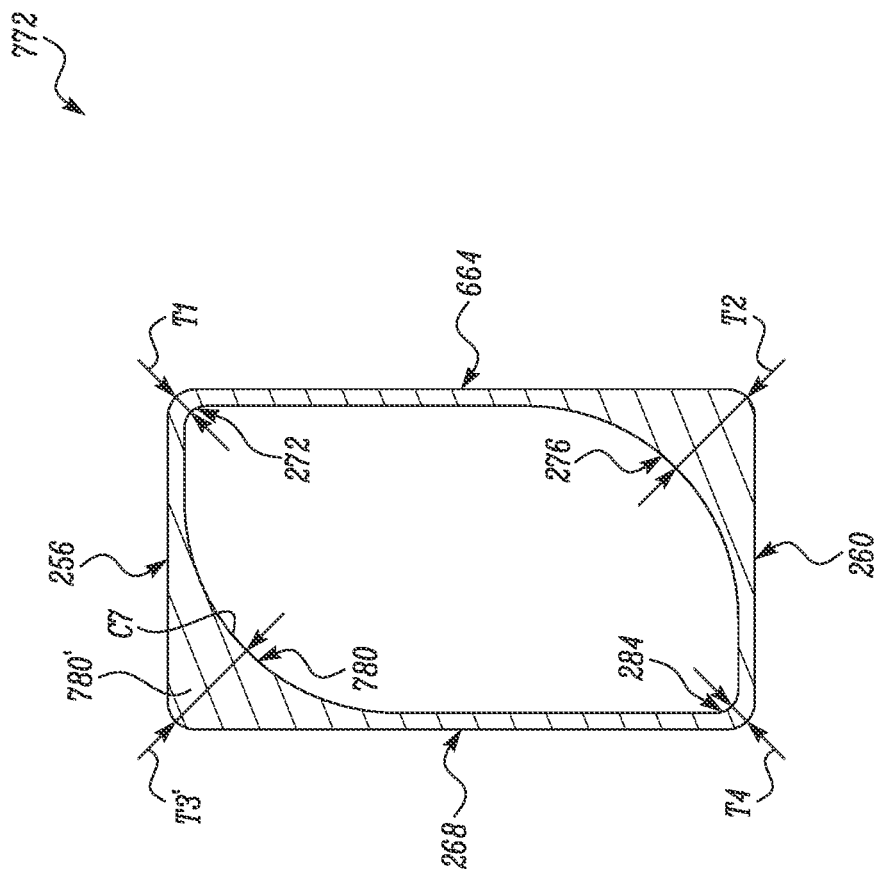
FIG. 7 illustrates a cross-sectional view of an axle of the axle assembly, in accordance with yet another embodiment of the present disclosure.

Referring to FIG. 7, a cross-section of an axle 772 is shown. The axle 772 may be similar in many respects to the axle 672 but may differ from the axle 672 in that the third corner portion 280 is omitted. Rather, the axle 772 includes a third corner portion 780. The third corner portion 780 corresponds to a third fillet portion 780' disposed between the first wall portion 256 and the fourth wall portion 268 to uninterruptedly and contiguously connect the first wall portion 256 with the fourth wall portion 268. The third corner portion 780 (or the third fillet portion 780') may define a seventh concavity 'C7' that faces toward the third wall portion 664. Also, the third corner portion 780 has a third thickness 'T3'. The third thickness 'T3' of the third corner portion 780 is equal to the second thickness 'T2' of the second corner portion 276.

INDUSTRIAL APPLICABILITY

When a mining machine (e.g., a large mining truck), similar to the mining machine 100', repeatedly traverses over rough terrain (e.g., between the load location and the dump location of the worksite 108), a front axle of such mining machine may encounter various loads (or stresses) and vibrations, particularly during braking and cornering events. These loads (or stresses) and vibrations may contribute to formation of high stress concentration regions at various locations on the front axle. Examples of such high stress concentration regions may include one or more regions surrounding drag links receptors 300 and a panhard rod receptor 304 (please see FIG. 3 and FIG. 4, respectively). The formation of such high stress concentration regions may result in premature failure of the front axle. The present disclosure provides the axle 172, 672, and 772, that exhibits sufficient stiffness and rigidity to withstand such loads (or stresses) and vibrations.

The axle 172, 672, 772, is light-weighted and exhibits high stiffness-to-weight ratio. The axle 172, 672, 772, may be easily manufactured, i.e., each of the first segment 204, the second segment 208, and the third segment 212, may be separately fabricated (e.g., via casting) and subsequentially joined together (e.g., via welding) to form the axle 172, 672, 772. The axle 172, 672, 772, can be easily retrofitted on existing large mining machines, with little or no modification, in turn, providing flexibility and compatibility. Utilizing the axle 172, 672, 772, may mitigate undesirable downtime of the machine 100, and minimize overall costs of operations of the machine 100.

It will be apparent to those skilled in the art that various modifications and variations can be made to the system and/or method of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. An axle for a mining machine, the axle comprising:
   one or more segments, each segment of the one or more segments defining:
   a first wall portion and a second wall portion disposed opposite to the first wall portion;
   a third wall portion extending between the first wall portion and the second wall portion to meet the first wall portion at a first corner portion and the second wall portion at a second corner portion, the first corner portion having a first thickness and the second corner portion having a second thickness; and
   a fourth wall portion disposed spaced apart from the third wall portion and extending between the first wall portion and the second wall portion to meet the first wall portion at a third corner portion and the second wall portion at a fourth corner portion, the third corner portion having a third thickness and the fourth corner portion having a fourth thickness,
   wherein the second thickness and the third thickness are greater than each of the first thickness and the fourth thickness.

2. The axle of claim 1, wherein the second thickness of the second corner portion is greater than the third thickness of the third corner portion.

3. The axle of claim 1, wherein the second thickness of the second corner portion is equal to the third thickness of the third corner portion.

4. The axle of claim 1, wherein the first wall portion has a fifth thickness, the second wall portion has a sixth thickness, and
   wherein the sixth thickness of the second wall portion is greater than the fifth thickness of the first wall portion.

5. The axle of claim 1, wherein the one or more segments correspond to at least three segments joined together to impart an integral and contiguously extending U-shaped profile to the axle.

6. The axle of claim 1, wherein the third wall portion defines a first arcuate section extending outwardly from the first corner portion, a second arcuate section extending outwardly from the second corner portion, and an intermediate section connecting the first arcuate section to the second arcuate section.

7. The axle of claim 6, wherein the first arcuate section defines a first concavity, the second arcuate section defines a second concavity, and
   wherein each of the first concavity and the second concavity faces away from the fourth wall portion.

8. The axle of claim 6, wherein a thickness of the second arcuate section is greater than thicknesses of the first arcuate section and the intermediate section.

9. The axle of claim 1, wherein the third wall portion is disposed proximal to a front end of the mining machine and distal to a rear end of the mining machine, and wherein the fourth wall portion is disposed proximal to the rear end of the mining machine and distal to the front end of the mining machine.

10. The axle of claim 1, wherein at least one of the third wall portion and the fourth wall portion is disposed upright relative to the second wall portion.

11. The axle of claim 1, wherein the first wall portion is disposed at a height relative to the second wall portion.

12. A mining machine comprising:
    a chassis;
    an axle coupled to the chassis, the axle including one or more segments, each segment of the one or more segments defining:
    a first wall portion and a second wall portion disposed opposite to the first wall portion;
    a third wall portion extending between the first wall portion and the second wall portion to meet the first wall portion at a first corner portion and the second wall portion at a second corner portion, the first corner portion having a first thickness and the second corner portion having a second thickness; and
    a fourth wall portion disposed spaced apart from the third wall portion and extending between the first wall portion and the second wall portion to meet the first wall portion at a third corner portion and the second wall portion at a fourth corner portion, the third corner portion having a third thickness and the fourth corner portion having a fourth thickness,
    wherein the second thickness and the third thickness are greater than each of the first thickness and the fourth thickness.

13. The mining machine of claim 12, wherein the second thickness of the second corner portion is greater than the third thickness of the third corner portion.

14. The mining machine of claim 12, wherein the second thickness of the second corner portion is equal to the third thickness of the third corner portion.

15. The mining machine of claim 12, wherein the first wall portion has a fifth thickness, the second wall portion has a sixth thickness, and
    wherein the sixth thickness of the second wall portion is greater than the fifth thickness of the first wall portion.

16. The mining machine of claim 12, wherein the one or more segments correspond to at least three segments joined together to impart an integral and contiguously extending U-shaped profile to the axle.

17. The mining machine of claim 12, wherein the third wall portion defines a first arcuate section extending outwardly from the first corner portion, a second arcuate section extending outwardly from the second corner portion, and an intermediate section connecting the first arcuate section to the second arcuate section,
  wherein the first arcuate section defines a first concavity, the second arcuate section defines a second concavity, and
  wherein each of the first concavity and the second concavity faces away from the fourth wall portion.

18. The mining machine of claim 17, wherein a thickness of the second arcuate section is greater than thicknesses of the first arcuate section and the intermediate section.

19. The mining machine of claim 12, wherein the third wall portion is disposed proximal to a front end of the mining machine and distal to a rear end of the mining machine, and wherein the fourth wall portion is disposed proximal to the rear end of the mining machine and distal to the front end of the mining machine.

20. The mining machine of claim 12, wherein at least one of the third wall portion and the fourth wall portion is disposed upright relative to the second wall portion, and
  wherein the first wall portion is disposed at a height relative to the second wall portion.

* * * * *